UNITED STATES PATENT OFFICE.

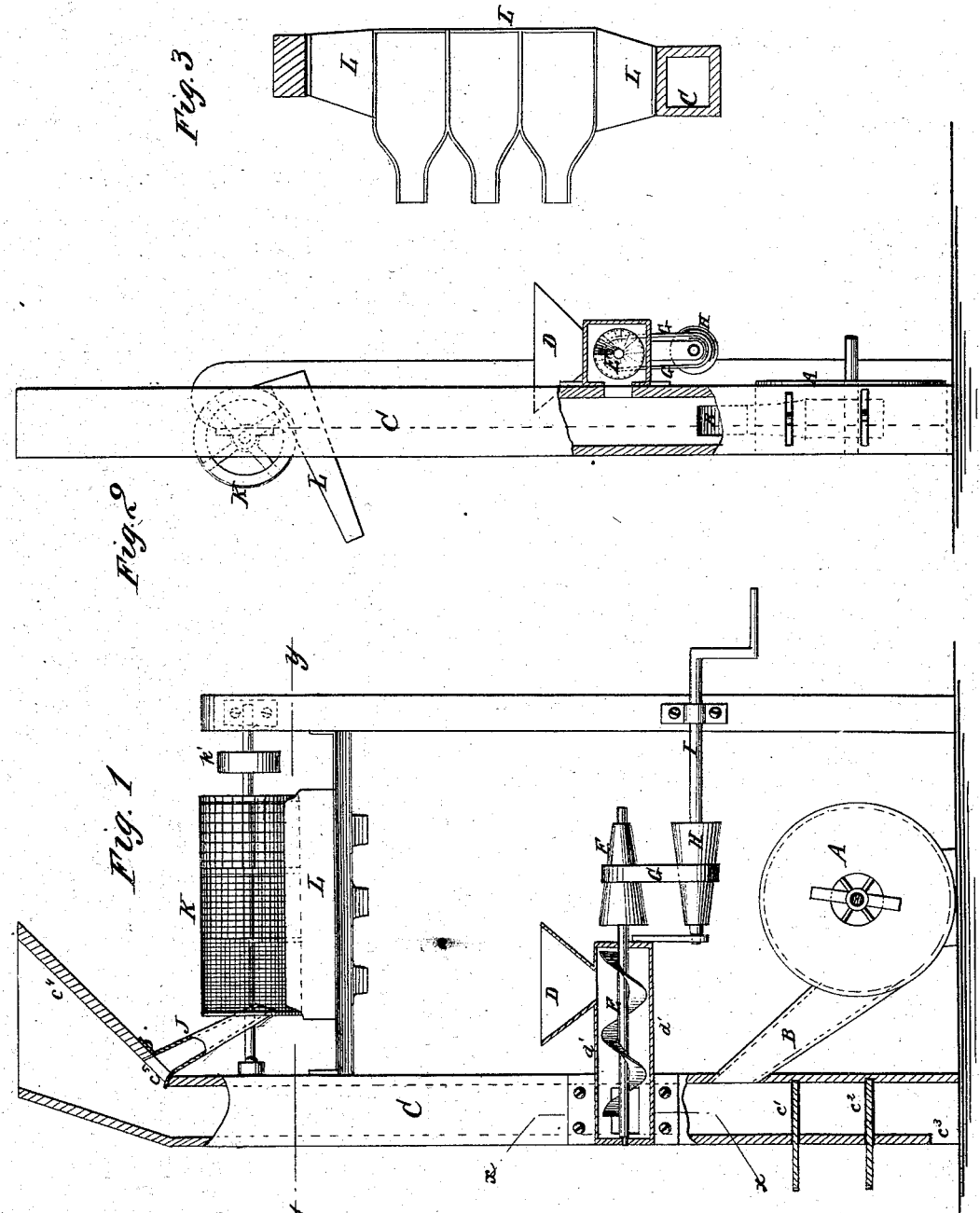

JOHN ARBUCKLE, JR., OF NEW YORK, N. Y.

IMPROVEMENT IN COFFEE CLEANERS AND GRADERS.

Specification forming part of Letters Patent No. 155,001, dated September 15, 1874; application filed June 27, 1874.

*To all whom it may concern:*

Be it known that I, JOHN ARBUCKLE, Jr., of New York, in the county and State of New York, have invented a new and useful Improvement in Coffee Cleaner and Grader, of which the following is a specification:

Figure 1 is a side view of my improved apparatus, parts being shown in section to show the construction. Fig. 2 is an edge view of the same, partly in section, through the line $x\,x$, Fig. 1. Fig. 3 is a horizontal section taken through the line $y\,y$, Fig. 1.

Similar letters of reference indicate corresponding parts.

My invention has for its object to furnish an improved apparatus designed especially for removing stones from coffee, but which will at the same time remove chaff and other light impurities, and will also grade the coffee, and which shall be simple in construction, convenient in use, and reliable and effective in operation.

The invention consists in the arrangement of a rotary sieve or perforated cylinder and a feeding device with relation to a spout having an inclined side, and through which an air-blast carries the coffee or other material to be cleaned and graded.

A represents an ordinary fan-blower, the discharge-spout B from which leads upward, as shown in Fig. 1, into a vertical spout, C, to discharge the blast into said spout C in an upward direction. D is the hopper, into which the coffee to be operated upon is fed by any convenient means. The hopper D is attached to and opens into a short horizontal spout, $d'$, the other end of which is attached to or connected with, and opens into, the vertical spout C. The coffee is fed through the spout $d'$ by a feed-screw, E, the journals of which revolve in bearings in the ends of the said spout $d'$. To the projecting end of one of the journals of the feed-screw E is attached a cone-pulley, F, around which passes a belt, G, which also passes around a cone-pulley, H, attached to the driving-shaft I, to which motion is given from any convenient power.

The cone-pulleys F H and band G may be replaced with any other suitable gearing, and when used should be provided with a belt-shifter and tension-pulley, to enable it to be readily controlled.

With this construction, as the coffee, either green or roasted, is fed into the spout C, it meets the ascending current of air from the fan-blower A, and by it is blown upward, while the stones that may be in it, being heavier, fall down into the lower part of the spout C, and rest upon a slide, $c^1$, passing in through a slot in one side of said spout C. By drawing the slide $c^1$ outward, the stones resting upon it are allowed to drop upon a second slide, $c^2$, placed at a suitable distance below the slide $c^1$. The slide $c^1$ is then pushed into place, and the slide $c^2$ is drawn outward. This allows the stones to fall into the lower part of the spout C, whence they may be removed through an opening, $c^3$, formed in the said spout.

The two slides $c^1$ $c^2$ enable the stones to be removed from the spout C whenever desired, and without stopping the machine or interrupting or checking the current of air passing through the said spout C.

The upper part, $c^4$, of the spout C is expanded, and deflected to one side, as shown in Fig. 1. This weakens the force of the current of air, so that the coffee falls upon the lower inclined side of said part $c^4$, while the chaff and any light impurities that may be in the coffee are blown out by the blast through the open upper end of said spout C. The coffee slides down the inclined lower side of the part $c^4$ of the spout, and falls through an opening, $c^5$, in the lower part of said inclined side into the spout J, through which it passes into the grading cylinder or screen K, which is covered with wire-cloth of different fineness of mesh, the mesh of the section next inlet-spout J being the finest, the mesh of the next section being a little coarser, and so on, according to the number of grades into which the coffee is to be separated. From the screen K the coffee falls into the spouts L, placed beneath the several sections of said screen, so as to conduct the coffee of each grade into its appropriate receiver.

The screen K is driven from any convenient power by a belt, which passes around a pulley, $k'$, attached to the shaft of the said cylinder K.

Having thus described my invention, I claim as new and desire to secure by Letters Patent—

The combination of the grader J K L with the vertical spout C, provided with inclined side $c^4$, the feeder D $d'$ E, and the fan-blower A B, all constructed and arranged to operate substantially as herein shown and described.

JOHN ARBUCKLE, JR.

Witnesses:
JAMES T. GRAHAM,
T. B. MOSHER.